(12) United States Patent
Marotzke

(10) Patent No.: US 6,170,870 B1
(45) Date of Patent: *Jan. 9, 2001

(54) AIRBAG FOR AIRBAG MODULE AND METHOD FOR FOLDING AIRBAG

(75) Inventor: Thomas Marotzke, Bergfelde (DE)

(73) Assignee: Petri AG, Aschaffenburg (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/101,172

(22) PCT Filed: Jan. 29, 1996

(86) PCT No.: PCT/DE96/00147

§ 371 Date: Jun. 1, 1998

§ 102(e) Date: Jun. 1, 1998

(87) PCT Pub. No.: WO97/28024

PCT Pub. Date: Aug. 7, 1997

(51) Int. Cl.[7] ................................................. B60R 21/16
(52) U.S. Cl. ................................. 280/743.1; 280/728.1
(58) Field of Search .......................... 280/743.1, 728.1; 493/405

(56) References Cited

U.S. PATENT DOCUMENTS

| | | | |
|---|---|---|---|
| 3,843,152 | 10/1974 | Nonaka | 280/150 AB |
| 3,876,272 | 4/1975 | Tsutsumi et al. | 339/3 S |
| 3,907,330 | 9/1975 | Kondo et al. | 280/150 AB |
| 4,173,356 | 11/1979 | Ross | 280/743 |
| 4,178,344 | 12/1979 | Smith et al. | 264/572 |
| 4,235,453 | 11/1980 | Lawson et al. | 280/743 |
| 4,351,544 | 9/1982 | Ross | 280/743 |

(List continued on next page.)

FOREIGN PATENT DOCUMENTS

| | | | |
|---|---|---|---|
| 2524770 | 12/1976 | (DE) | B60R 21/10 |
| 4138645 | 6/1992 | (DE) | B60R 21/20 |
| 4227559 A1 | 2/1994 | (DE) | . |
| 4343026 | 6/1994 | (DE) | . |
| 4422276 | 12/1994 | (DE) | . |
| 19502744 | 3/1996 | (DE) | . |
| 19516494 | 10/1996 | (DE) | B60R 21/20 |
| 0478897 | 4/1992 | (EP) | B60R 21/16 |
| 0614786 | 9/1994 | (EP) | B60R 21/16 |
| 0619204 | 10/1994 | (EP) | B60R 21/20 |

(List continued on next page.)

OTHER PUBLICATIONS

Patent Abstracts of Japan, Publication No. 03279053, Publication Date Dec. 10, 1991, 1 page.

Airbags Are Everywhere: How Are They Doing?, by Carl E. Nash, Ph.D. 2nd International Akzo Symosium On Occupatent Restraint Systems, Mar. 25–27, 1992, pp. 84–93 (English and German translations).

PAM–SAFE; Seminar Notes by Engineering Systems International, 8 pages, Jul. 1990.

Adomeit, H–D: "Neue Methoden Und Neue Ziele Bei Der Entwicklung Von Insassen Schutzsystemem/New Methodology and New Targest In Development Of Occupant Protection Systems" ATZ Automobiltechnische Zeitschrift Bd. 97, Nr. 07/08 pp. 458–462 (with English translation blow–up of p. 459).

*Primary Examiner*—Peter C. English
(74) *Attorney, Agent, or Firm*—Christie, Parker & Hale, LLP

(57) ABSTRACT

The invention concerns a gas bag for an airbag module, the gas bag being concertinaed in the region of a gas generator in the rest state. According to the invention, the gas bag stack formed by the concertina folds is additionally curved at least once in a plane extending perpendicular to the fold surfaces and parallel to the fold edges. A gas bag folded in this way can easily unfold since no section thereof is folded over the other.

13 Claims, 6 Drawing Sheets

U.S. PATENT DOCUMENTS

| | | | |
|---|---|---|---|
| 4,718,884 | 1/1988 | Iwase et al. | 493/419 |
| 4,842,300 | 6/1989 | Ziomek et al. | 280/732 |
| 4,903,986 | 2/1990 | Cok et al. | 280/743 |
| 4,936,819 | 6/1990 | Sundberg | 493/451 |
| 5,022,676 | 6/1991 | Rogerson et al. | 280/743 |
| 5,037,370 | 8/1991 | Sundberg | 493/451 |
| 5,114,180 | 5/1992 | Kami et al. | 280/743 |
| 5,140,799 | 8/1992 | Satoh | 53/429 |
| 5,162,035 | 11/1992 | Baker | 493/405 |
| 5,163,893 | 11/1992 | Hara et al. | 493/458 |
| 5,178,407 | 1/1993 | Kelley | 280/728 |
| 5,300,011 | 4/1994 | Budde et al. | 493/405 |
| 5,360,387 | 11/1994 | Baker | 493/405 |
| 5,391,137 | 2/1995 | DePoy et al. | 493/405 |
| 5,413,376 | 5/1995 | Filion et al. | 280/728 |
| 5,456,651 | 10/1995 | Baker et al. | 493/405 |
| 5,482,317 | 1/1996 | Nelsen et al. | 280/743 |
| 5,493,846 | 2/1996 | Baker et al. | 53/429 |
| 5,531,476 | 7/1996 | Kerner | 280/743 |
| 5,690,358 | 11/1997 | Marotzke . | |
| 5,803,892 | 9/1998 | Marotzke | 493/451 |

FOREIGN PATENT DOCUMENTS

| | | | |
|---|---|---|---|
| 691245 | 1/1996 | (EP) | B60R 21/20 |
| 829396 | 3/1998 | (EP) | B60R 21/16 |
| 2192841 | 1/1988 | (GB) | B60R 21/16 |
| 51-68043 | 6/1976 | (JP) | B60R 21/12 |
| 52-14497 | 4/1977 | (JP) | B60R 21/12 |
| 53-26888 | 8/1978 | (JP) | B60R 21/12 |
| 53-26889 | 8/1978 | (JP) | B60R 21/12 |
| 58-49541 | 3/1983 | (JP) . | |
| 2279442 | 11/1990 | (JP) | B60R 21/12 |
| 5-85292 | 4/1993 | (JP) . | |
| WO9633886 | 10/1996 | (WO) | B60R 21/16 |
| WO9634781 | 11/1996 | (WO) | B60R 21/16 |
| WO9710124 | 3/1997 | (WO) | B60R 21/16 |
| WO9712782 | 4/1997 | (WO) . | |
| WO9728024 | 8/1997 | (WO) | B60R 21/16 |
| WO9735745 | 10/1997 | (WO) | B60R 21/16 |
| WO9745296 | 12/1997 | (WO) | B60R 21/16 |
| WO9748580 | 12/1997 | (WO) | B60R 21/16 |

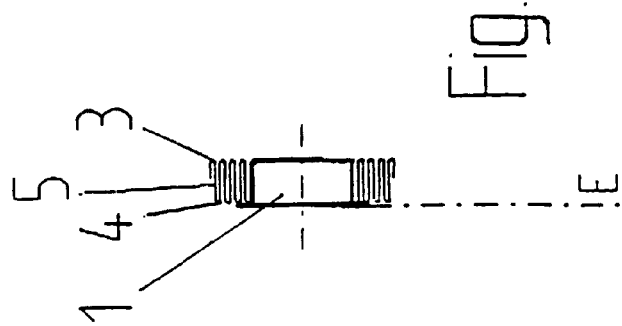
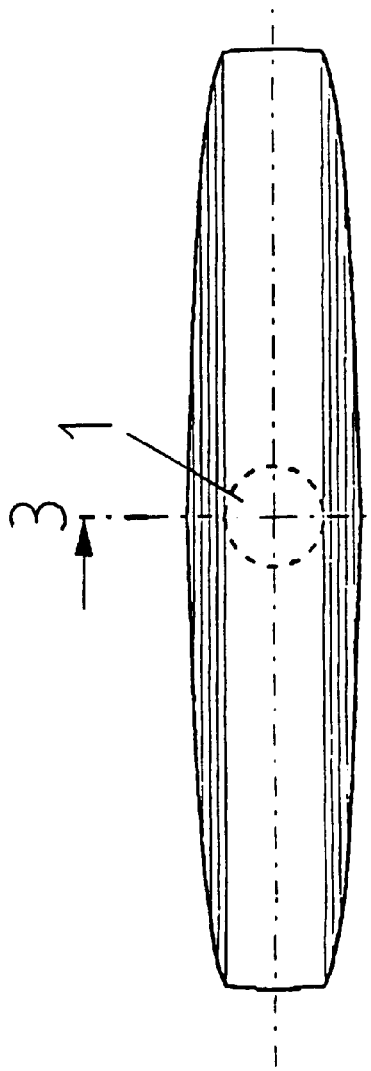
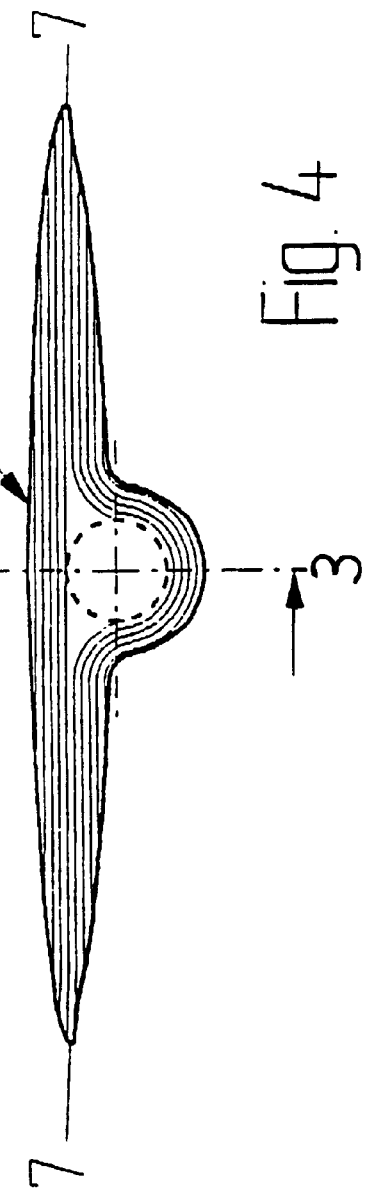

AIRBAG FOR AIRBAG MODULE AND METHOD FOR FOLDING AIRBAG

FIELD OF THE INVENTION

The invention relates to an airbag and a method for folding airbags.

BACKGROUND OF THE INVENTION

In airbag modules the airbags are arranged in a folded state in their rest position in the area of a gas generator. For this it is necessary inter alia to arrange the folding and positioning in the area of the gas generator so that after the gas generator is detonated the airbag unfolds easily unhindered and can be rapidly filled with gas.

The so-called continuous fan-fold method of folding is already known. Here the spread-out airbag is placed concertina-like in folds starting from a central (imaginary) centre line and extending each side of this line so that an oblong roughly rectangular strip is produced. Then this strip itself is folded several times in its longitudinal direction by placing the ends over the middle area or by rolling in the ends. An example is shown in EP 0 614 786 A1.

The drawback with this type of folding is that after detonation of the gas generator and with the gas pressure which thereby arises in the centre of the airbag the outer folds which have been formed by cross-folding hinder the unfolding of the longitudinal folds and at first the cross folds which have been turned in last and whose outer areas can only be reached with difficulty at first by the gas pressure arising in the centre have to unfold first before the longitudinal folds which were the first to be folded when collapsing the airbag can themselves be unfolded.

Furthermore there is the drawback that the airbags folded in this way have still to be folded by hand at least in part.

From DE 41 38 645 A1 an airbag is known which is first folded in zig-zag fashion into a number of longitudinally aligned folding paths on opposite side areas of the airbag. The airbag is then folded in zig-zag fashion into a number of transversely-aligned folding paths from the rear end of the airbag outside of the socket area towards the front end of the airbag.

Furthermore an airbag is known from DE 43 43 026 A1 which is first turned in to the inside from the sides. The centers of the turned-in parts are then drawn to the outside. The airbag prefolded in this way is again folded cross-wise to the first folding direction.

Even with these types of folding there is the disadvantage that the airbags can only be mechanically folded at extremely high cost and that the folds intersect so that they impede each other as they unfold.

It is also known from DE 44 22 276 A1 to fold the airbag along main fold lines which run at least in part along closed paths round an imaginary centre on the substantially empty spread-out airbag. Thus starting from an imaginary centre of the spread-out airbag a type of concentric zig-zag or concertina-type folding is produced. The main fold lines preferably form concentric circles or ellipses.

With the airbag folded in this way, folding individual sections of the airbag over each other is no longer necessary. Furthermore by gathering up the airbag it is possible to collapse the airbag into a compact unit. The airbag folded in this way can then unfold quickly and unhindered in all directions once the gas generator is detonated and folding can also be carried out substantially automatically.

SUMMARY OF THE INVENTION

The object of the present invention is in the case of a straight-line concertina-type folding of an airbag to achieve faster unfolding after detonation of the gas generator and to achieve automatic folding of the airbag.

In the case of an airbag for an airbag module where the airbag is folded in the rest state concertina-like in the area of a gas generator, the airbag packet which is formed by the concertina-type folds is additionally bent down at least once in a plane which runs perpendicular to the fold surfaces and parallel to the fold edges. More particularly the airbag packet formed by the concertina type folds is additionally bent down at least once in a plane which runs in relation to the concertina type folds perpendicular to the fold surfaces, parallel to the two planes in which each lower and upper fold edges lie, and parallel to the front side of the airbag module facing the occupant in the installed state.

The airbag packet is thereby folded, starting from two opposite sections relative to the gas generator, repeatedly in the direction of the ends of the airbag packet.

In a preferred embodiment the airbag packet is folded repeatedly so that a concertina-type fold is likewise provided in the second folding direction.

An airbag folded in this way can be easily unfolded in the same way as an airbag which is folded concentric according to the gathered folding mentioned above, since no section of the airbag is folded over another. Furthermore there is the advantage that only one layer of airbag lies above the gas generator. During inflation of the airbag this layer is moved in the direction of the vehicle occupant and draws the folds of the airbag packet behind it. The same favorable unfolding is reached here as with gathered folding. As opposed to this in the case of other known types of folding where the folded packet lies above the gas generator the airbag is pressed out during inflation.

This folding can be used with particular advantage in the case of a driver airbag module where the airbag is folded round a pot-shaped gas generator wherein the height of the folded airbag packet corresponds roughly to the height of the gas generator. Also in this embodiment the same advantages are produced as in the case of an airbag with concentric gathered folding.

In one embodiment for a driver airbag the airbag is bent down on both sides on either side of the gas generator. The strips of the concertina type folded airbag packet thereby formed are stored in the area of the spokes of the steering wheel.

In one embodiment where a tubular gas generator is mounted inside or underneath the airbag the airbag is folded at least approximately parallel to the longitudinal axis of the tubular gas generator. The strips of the folded airbag protruding over the ends of the tubular gas generator are bent down in opposite directions and placed against the middle sections or against the centre part of the airbag.

In one embodiment where the airbag is arranged asymmetric relative to a tubular gas generator the airbag folded at least approximately parallel to the longitudinal axis of the tubular gas generator protrudes only at one end of the tubular gas generator and the protruding strip lies on one side against the tubular gas generator. Also in this case the tubular gas generator is arranged inside or underneath the airbag.

The folding according to the invention is carried out in such a way that the airbag is placed in a first step in straight at least roughly parallel folds and that the airbag packet thus formed is then bent down additionally at least once from its middle area out towards the ends of the folds in a plane which runs parallel to the two planes in which the lower and upper fold edges each lie and parallel to the front side of the airbag module facing the occupant in the installed state. The airbag packet is then likewise folded concertina-like in this plane.

In a preferred use of the folding for a driver airbag module the airbag is folded on each side of a pot-shaped gas generator in a first step in straight parallel folds in the direction of the gas generator. In a second step the areas of the airbag protruding at the gas generator are compacted into a packet which is then folded up concertina-like against the gas generator.

In an embodiment for an airbag module where a tubular gas generator is mounted inside or underneath an airbag the airbag is folded at first at least approximately parallel to the longitudinal axis of the tubular gas generator. The ends of the folded airbag protruding over the ends of the tubular gas generator are bent down in opposite directions and placed against the middle sections or against the middle part of the airbag.

In a further embodiment with an airbag module where a tubular gas generator is mounted asymmetric inside or underneath the airbag the airbag is folded at least approximately parallel to the longitudinal axis of the tubular gas generator and the strip of the folded airbag projecting over one end of the tubular gas generator is placed against the tubular gas generator.

DESCRIPTION OF THE DRAWINGS

The invention will now be explained in further detail with reference to the embodiments shown in the drawings in which:

FIG. 2 shows the airbag according to FIG. 1 in the parallel folded state with the gas generator lying underneath;

FIG. 3 shows a section 3—3 through the airbag folded according to FIGS. 2 and 4;

FIG. 4 shows an airbag according to FIG. 2 folded parallel again at its ends;

DETAILED DESCRIPTION OF THE INVENTION

Figure 1:
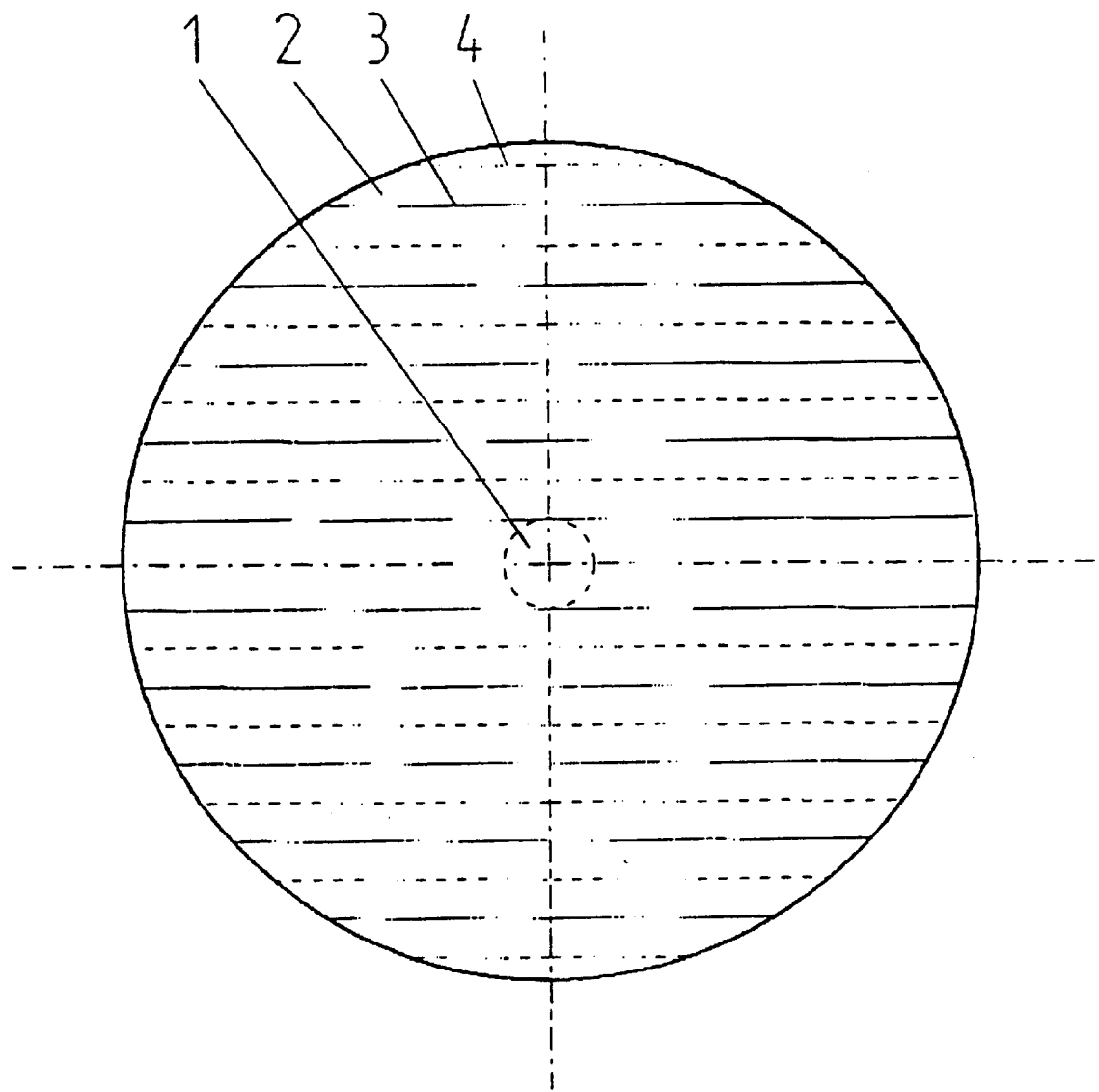
FIG. 1 is a plan view of a spread out airbag with a gas generator underneath having a pot shape.

FIG. 1 shows diagrammatically a gas generator 1 on which an airbag 2 is fixed, the airbag 2 is shown in the spread-out state. In a first phase, the airbag is folded along parallel fold edges. The upper fold edges 3 are shown as solid lines and the lower fold edges 4 are shown as dotted lines wherein reference is made top and bottom to the gas generator (FIG. 4). The fold edges are not yet present in the spread out state of the airbag. The illustration of FIG. 1 is to show where the fold edges lie when folding is carried out.

In a first work step the airbag 2 is folded concertina-like or wave-like from each side of the gas generator 1, as can be seen in FIGS. 2 and 4. The fold edges 3, 4 and thus also fold surfaces 5 lie parallel in the first folding phase (FIG. 3). The height of the fold surfaces 5 corresponds to the height of the gas generator 1.

In the following step the sections of the folded airbag which lie next to the gas generator 1 are pressed further towards each other so that the folded airbag packet 6 shown in FIG. 4 is formed.

Figure 5:
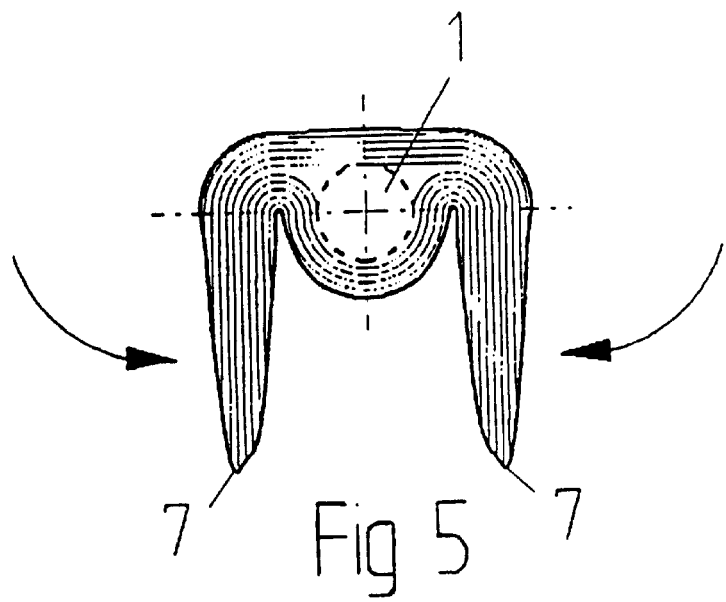
FIGS. 5 to 7 show the folding steps for the additional concertina-type folds of the airbag packet.
Figure 6:
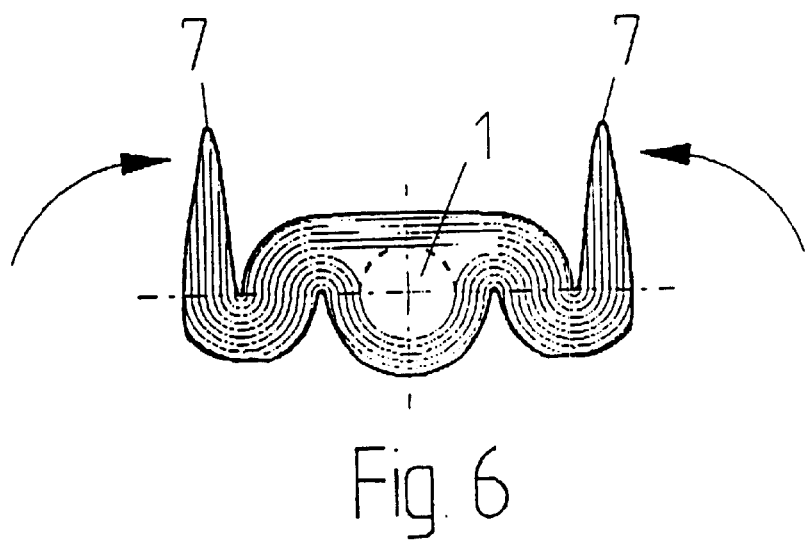
Figure 7:
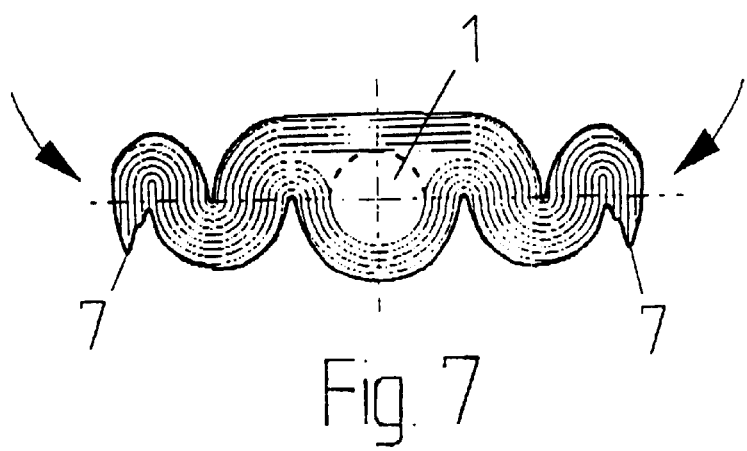

Further folding of the airbag packet 6 is shown in FIGS. 5 to 7. As can be seen in FIG. 5 the airbag packet 6 is first bent down on opposite sides of the gas generator 1 in a plane which runs perpendicular to the fold faces 5 and parallel to the fold edges 3,4. The airbag packet is then bent round again in the opposite direction in this plane as shown in FIG. 6. Finally the ends 7 of the airbag packet 6 are bent down again in the opposite direction in this plane, as shown in FIG. 7 so that the airbag packet is also folded concertina-like. This packet is then compressed further in the direction of the gas generator so that it can be stowed away in the steering wheel of a motor vehicle.

Since with this type of folding no parts of the airbag are folded over each other, the airbag can be easily unfolded after detonation of the gas generator without sections of the airbag mutually hindering each other during folding.

Figure 8:
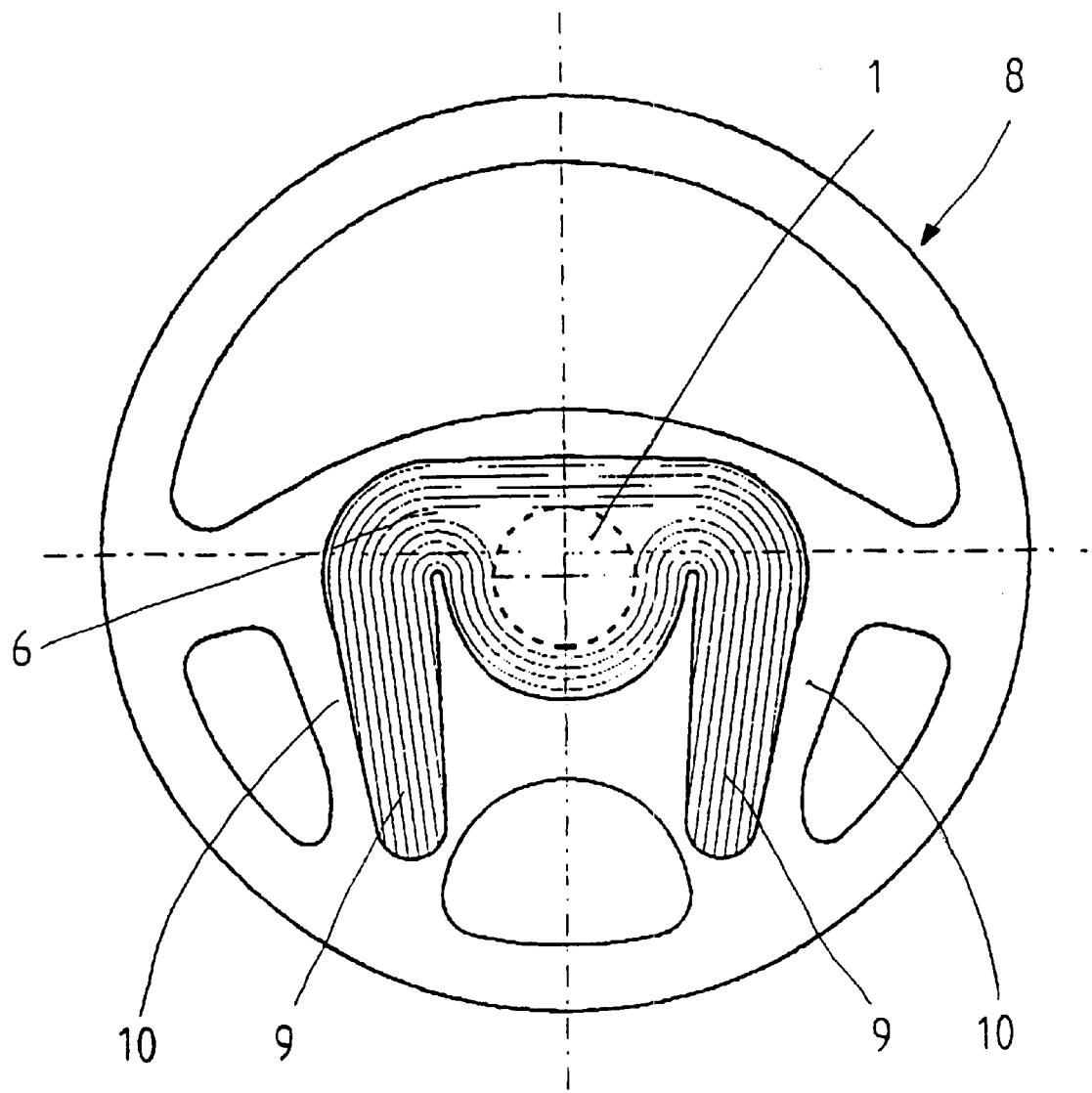
FIG. 8 shows the arrangement of an airbag folded according to FIG. 5 in a steering wheel.

In FIG. 8 it is shown how an airbag folded according to FIG. 5 is stored in a steering wheel 8 of a motor vehicle. The airbag standing in vertical folds is bent down at the sides and the remaining oblong strips 9 of the airbag packet are stored in space-saving manner next to the gas generator in the area of the spokes 10 of the steering wheel 8.

An airbag packet folded and bent down in this way can also be stored in other component parts of the vehicle interior such as for example in a seat back or door lining as a side airbag or in the dashboard as a passenger airbag.

Figure 9:
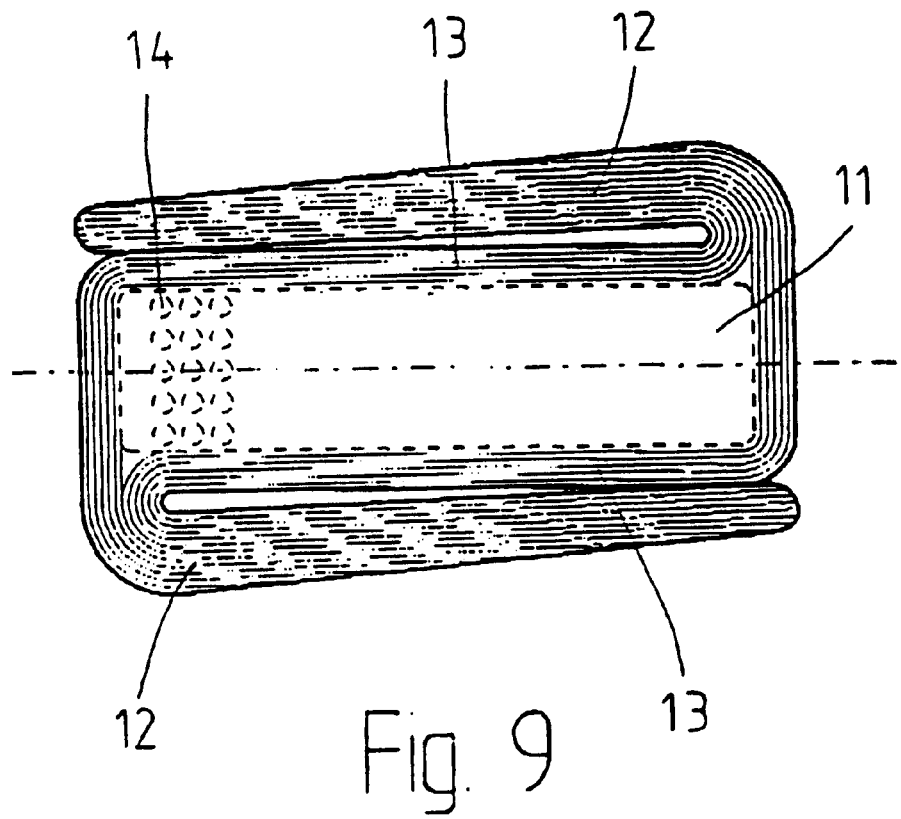
FIG. 9 shows a folded airbag with a tubular gas generator lying on the inside.

FIG. 9 shows the use of an airbag in conjunction with a cylindrical tubular generator 11, which is mounted in the airbag. In this embodiment the airbag is folded first parallel to the longitudinal axis of the tubular gas generator 11. The strips 12 protruding over the ends of the tubular gas generator are then bent round and placed against the sections 13 of the airbag running in the area of the tubular gas generator. Since also with this use there are no parts of the airbag folded over each other, the airbag can be easily unfolded after detonation of the gas generator and emergence of the gas out of the gas outlet openings 14 without sections of the airbag mutually hindering each other during unfolding.

Figure 9A:
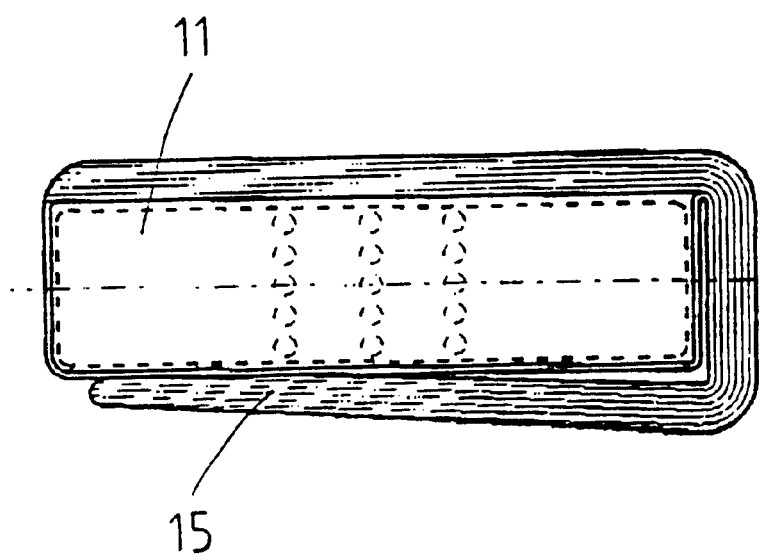
FIG. 9a shows a variation of the embodiment of FIG. 9.

Also in the embodiment of FIG. 9a a cylindrical tubular gas generator 11 is shown as in FIG. 9 arranged in the airbag. However the difference between this and FIG. 9 is that the airbag here is markedly asymmetric, or rather the gas generator 11 is not located in the surface centre of gravity of the airbag. This embodiment is particularly suited as a side airbag. The airbag is here likewise folded first parallel to the longitudinal axis of the tubular gas generator. The airbag projects over the tubular gas generator only at one end. This protruding section 15 is then bent round and placed against the tubular gas generator.

Figure 10:
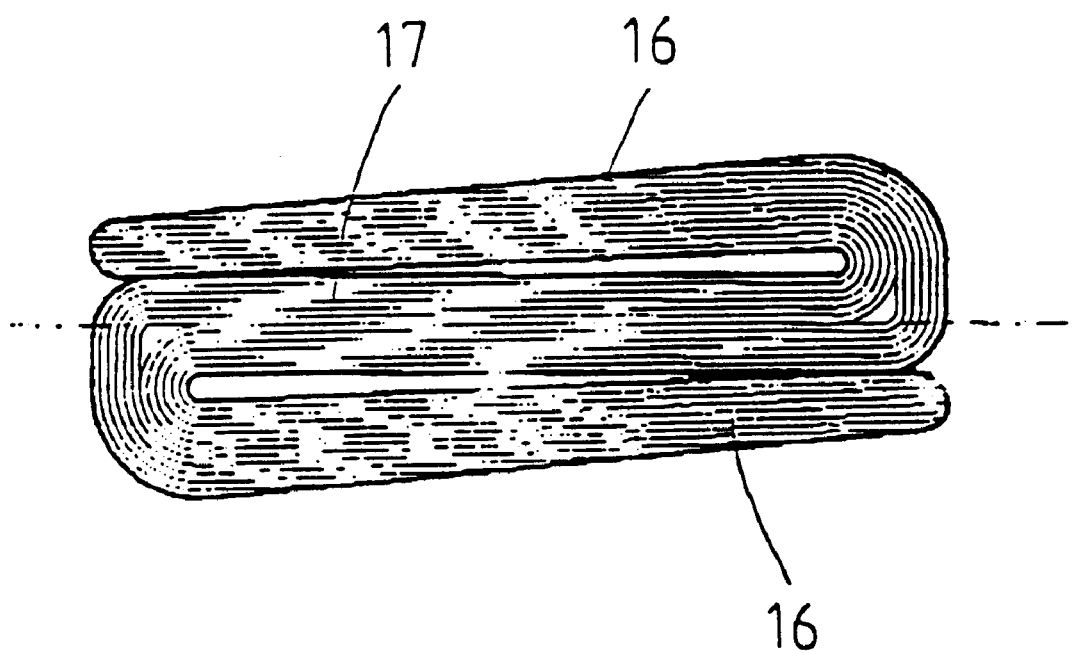
FIG. 10 shows a folded airbag arranged over a gas generator.

In the embodiment of FIG. 10 where the gas generator (not shown) is provided underneath the airbag, a parallel folding of the airbag packet is likewise carried out at first. Then strips 16 at both ends are bent round in opposite directions and placed against the centre part 17.

As shown in the embodiments the folding method claimed can be used for all known types of generator and for airbag modules having internal tubular gas generators. Furthermore it can also be used for airbag modules where a diffuser projects into the airbag.

What is claimed is:

1. An airbag for an airbag module wherein the airbag is folded with concertina folds in the area of a gas generator in a rest state to form an airbag packet having fold surfaces and lower and upper fold edges, and wherein the airbag packet formed by the concertina folds is additionally bent at least once in a plane which in relation to the concertina folds runs perpendicular to the fold surfaces, parallel to two planes in which the lower and upper fold edges each lie, and parallel to a front side of the airbag module facing an occupant in an installed state.

2. An airbag according to claim 1, wherein the concertina folds are the folds of the airbag packet in a first folding direction, wherein the airbag packet is folded several times in a second folding direction in which ends of the airbag packet are folded starting from two opposing sections relative to the gas generator.

3. An airbag according to claim 1, wherein the concertina folds are the folds of the airbag packet in a first folding direction, wherein the airbag packet is folded several times so that concertina folds likewise exists in a second folding direction.

4. An airbag according to claim 1, wherein the airbag is folded round the gas generator, wherein the height of the folded airbag packet corresponds roughly to the height of the gas generator.

5. An airbag according to claim 1, wherein the airbag is bent along sides of the gas generator and resulting strips of the concertina folded airbag packet are stored in the area of spokes of a steering wheel.

6. An airbag according to claim 1, wherein the gas generator is tubular and is mounted inside or underneath the airbag, the airbag is folded at least approximately parallel to the longitudinal axis of the tubular gas generator and strips of the folded airbag protruding over the ends of the tubular gas generator are bent in opposite directions and are placed against center sections or against a center part of the airbag.

7. An airbag according to claim 1, wherein the gas generator is tubular, the airbag is mounted asymmetric relative to the tubular gas generator, the airbag is folded at least approximately parallel to the longitudinal axis of the tubular gas generator such that the airbag protrudes past one end of the tubular gas generator and a protruding strip is placed on one side against the tubular gas generator.

8. A method for folding an airbag, comprising:
   folding the airbag into straight, at least roughly parallel, concertina folds to form an airbag packet; and
   then folding additionally at least once starting from a middle area of the airbag towards an end of the folds in a plane which runs perpendicular to fold surfaces of the airbag packet, parallel to two planes in which lower and upper fold edges of the airbag packet each lie and parallel to a front side of an airbag module facing an occupant in an installed state.

9. A method according to claim 8, wherein the airbag is folded about sides of a gas generator in straight parallel folds in the direction of the gas generator, and then areas of the airbag protruding past the gas generator are compacted into a packet which is then folded up into concertina folds against the gas generator.

10. A method according to claim 8, wherein a tubular gas generator is mounted inside or underneath the airbag, the airbag is folded at least approximately parallel to the longitudinal axis of the tubular gas generator and strips of the folded airbag protruding over the ends of the tubular gas generator are bent in opposite directions and placed against middle sections or a center part of the airbag.

11. A method according to claim 8, wherein a tubular gas generator is mounted asymmetric inside or underneath the airbag, the airbag is folded at least approximately parallel to the longitudinal axis of the tubular gas generator and a strip of the folded airbag projecting over an end of the tubular gas generator is placed against the tubular gas generator.

12. A folded airbag in a rest state near an area of a gas generator comprising:
   a front side facing an occupant in an installed state;
   a plurality of fold surfaces including first, second and third fold surfaces;
   the first fold surface having a lower edge and an upper edge opposite the lower edge, and lying in a plane;
   the second fold surface having a lower edge and an upper edge opposite the lower edge, and lying in a plane that is substantially parallel to the plane of the first fold surface, the second fold surface being adjacent the first fold surface; and
   the third fold surface having a lower edge and an upper edge opposite the lower edge, and lying in a plane that is substantially parallel to the planes of the first and second fold surfaces, the third fold surface being adjacent the second fold surface,
   wherein the lower edges of the fold surfaces are substantially aligned with each other and the upper edges of the fold surfaces are substantially aligned with each other,
   wherein the lower edge of the second fold surface is connected to the lower edge of the first fold surface,
   wherein the upper edge of the second fold surface is connected to the upper edge of the third fold surface,
   wherein the plurality of fold surfaces form two strips which are bent at least once in a plane which is perpendicular to the fold surfaces, parallel to two planes in which the lower and upper fold edges each lie, and parallel to the front side.

13. An airbag for an airbag module wherein the airbag has folds shaped as waves in the area of a gas generator in a rest state to form an airbag packet having fold surfaces and lower and upper fold edges, wherein the wave folds have minima and maxima that correspond to the lower and upper fold edges, respectively, wherein the wave folds alternate periodically between the maxima and minima, wherein the airbag packet formed by the wave folds is additionally bent at least once in a plane which in relation to the wave folds runs perpendicular to the fold surfaces, parallel to two planes in which the lower and upper fold edges each lie, and parallel to a front side of the airbag module facing an occupant in an installed state.

* * * * *